US006979793B2

(12) United States Patent
Shiibashi et al.

(10) Patent No.: US 6,979,793 B2
(45) Date of Patent: Dec. 27, 2005

(54) MAIL SORTING AND DISTRIBUTING TRANSFER SYSTEM

(75) Inventors: Ryosuke Shiibashi, Osaka (JP); Toshio Kanbe, Osaka (JP); Masakazu Shimomura, Osaka (JP); Shigeru Yoshikawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 331 days.

(21) Appl. No.: 10/444,183

(22) Filed: May 23, 2003

(65) Prior Publication Data

US 2004/0016681 A1 Jan. 29, 2004

(30) Foreign Application Priority Data

Jun. 27, 2002 (JP) ............................ 2002-187950

(51) Int. Cl.[7] ................................................ B65G 1/12
(52) U.S. Cl. ....................... 209/584; 209/919; 414/272
(58) Field of Search ............................... 209/583, 584, 209/900, 912, 918, 919; 198/465.4, 474.1, 198/475.1, 486.1; 414/268, 272, 283

(56) References Cited

U.S. PATENT DOCUMENTS 1,482,311 A * 1/1924 Long et al. ................ 414/271
3,302,804 A 2/1967 Harris
4,199,291 A * 4/1980 Winiasz et al. ........ 414/416.06
5,893,447 A * 4/1999 Brintazzoli .............. 198/343.2
6,276,509 B1 * 8/2001 Schuster et al. ....... 198/370.02
6,315,101 B1 * 11/2001 Hugon .................. 198/370.07
6,747,231 B1 * 6/2004 Bretschneider et al. ..... 209/584

FOREIGN PATENT DOCUMENTS

EP 0 640 409 A2 3/1995
EP 000820818 A1 * 1/1998 ............ B07C 3/08
EP 0 949 015 A2 10/1999
JP 63-8824 2/1988

* cited by examiner

*Primary Examiner*—Donald P. Walsh
*Assistant Examiner*—Joseph C. Rodriguez
(74) *Attorney, Agent, or Firm*—Dann, Dorfman, Herrell and Skillman, P.C.; Henry H. Skillman

(57) ABSTRACT

To provide a mail sorting and distributing transfer system, which extends transformable time of mail fed from a mail charging line so that the mail can be timely, reliably transferred to conveyor baskets on a mail sorting line, there is a mail sorting and distributing transfer system in which transfer timing levers maintain the receipt ports of transfer baskets provided on an outer circumferential edge of a sorting and distributing turntable in a state where the receipt ports of the transfer baskets are in registry with a mail charging line during the receipt of mail and where the lever pivots so it moves the associated transfer basket. Underlying conveyor baskets on a mail sorting line are moved parallel to and in synchronization with the transfer baskets during the transfer of the mail. The lever is pivoted about an axis parallel to the axis of the mail sorting and distributing turntable.

4 Claims, 8 Drawing Sheets

MAIL SORTING AND DISTRIBUTING TRANSFER SYSTEM

FIELD OF THE INVENTION

The present invention relates to a mail-sorting and distributing conveyor system, which receives mail supplied from a mail charging line provided with a mail-sorting receiver data reader and the like, and distributes the mail to conveyor baskets on a mail-sorting line for sorting the mail in accordance with the mail-sorting receiver data.

BACKGROUND OF THE INVENTION

As disclosed in, for example Japanese examined patent publication No. Sho. 63-8824, a conventional mail-sorter includes a synchronous conveyor section, which charges mail into a conveyor box while mail holders are shifted in synchronization with the movement of the conveyor boxes for sorting mail so that the mail holders are adapted to transfer the mail to the conveyor boxes while shifting a fixed section in synchronization with the movement of the conveyor boxes.

Such a conventional mail sorter must transfer mail in timed relation to a conveyor box moving through a mail holder section. However, the time when a receipt port of the conveyor box is registered with the mail holder is an instant and after that, the registration of both the receipt port of the conveyor box and the mail holder section is modified to be in a V-shaped arrangement. Thus, transferable time therebetween is short, and when the transfer timing is shifted even a little, there is a problem of generating transfer failure. Accordingly, when it was attempted to solve this problem, the receipt port was changed to a large port. As a result there occurred a problem that the mounting pitch between the continually arranged transfer boxes needed to be increased, and the conveyor sorting efficiency was significantly decreased.

Accordingly, the objects of the present invention are to solve the problem of the above-described conventional prior art technology, and to provide a mail sorting and distributing transfer system, which enlarges the transfer time for mail fed from a mail charging line so that the mail can be reliably transferred in timed relation to conveyor baskets on the mail sorting line.

SUMMARY OF THE INVENTION

First, according to the invention, the above-mentioned object can be solved by a mail sorting and distributing transfer system, which receives mail supplied from a mail charging line through receipt ports of transfer baskets provided on an outer circumferential edge of a mail sorting and distributing turntable and then transfers the mail to conveyor baskets on the mail sorting line through openable transfer ports provided in a bottom portion of said transfer baskets, characterized in that transfer timing levers, which maintain receipt ports of the transfer baskets in a state where the receipt ports of the transfer baskets were registered with the mail charging line during the receipt of mail. The levers pivot the transfer baskets, and the conveyor baskets under the transfer baskets are free to pivot in parallel to and in synchronization with the transfer baskets during the transfer of the mail and during travel around said mail sorting and distributing turntable.

According to the invention, the above-mentioned object can be further solved by a mail sorting and distributing transfer system, characterized in that the transfer timing lever comprises a follower arm actuated along a transfer timing track formed on a framework side fixed frame and a suspended arm slidably actuated along an arc-shaped guide rail on the mail sorting and distributing turntable.

The term "mail" in the mail sorting and distributing transfer system of the present invention means sheet-shaped mail in which a flat object such as a magazine or the like was sealed in. The term "mail charging line" means a line including a mail sorting receiver data reader for conveying mail to a subsequent line for sorting and distributing mail. Further, the term "mail sorting line" means a line for distributing mail in a conveyor basket to a mail recovery box selected according to required sorting receivers based on sorting receiver data read by a sorting receiver data reading mechanism in said mail charging line or the like.

Since the mail sorting and distributing transfer system according to the present invention has the above-described configurations, it receives mail supplied from a mail charging line through a transfer basket and transfers the mail from this transfer basket to an underlying conveyor basket on the mail sorting line. Particularly, since each of the transfer timing levers is pivoted about the shaft of a sorting and distributing turntable. The outer circumferential edge of the turntable has transfer baskets for receiving the mail supplied from the mail charging line, and the transfer timing lever maintains the receipt port in the transfer basket in a state where the receipt port in the transfer basket is registered with the mail charging line during the receipt of mail, and maintains the transfer basket in registry therewith during the transfer of mail. The mail sorting line moves the conveyor baskets in parallel to and in synchronizatino with the transfer baskets. Thus, respective times when mail is received from the mail charging line for transfer basket and when mail is transferred from the transfer basket to the conveyor basket can be sufficient.

DESCRIPTION OF THE PREFERRED EMBODIMENT

Figure 1:
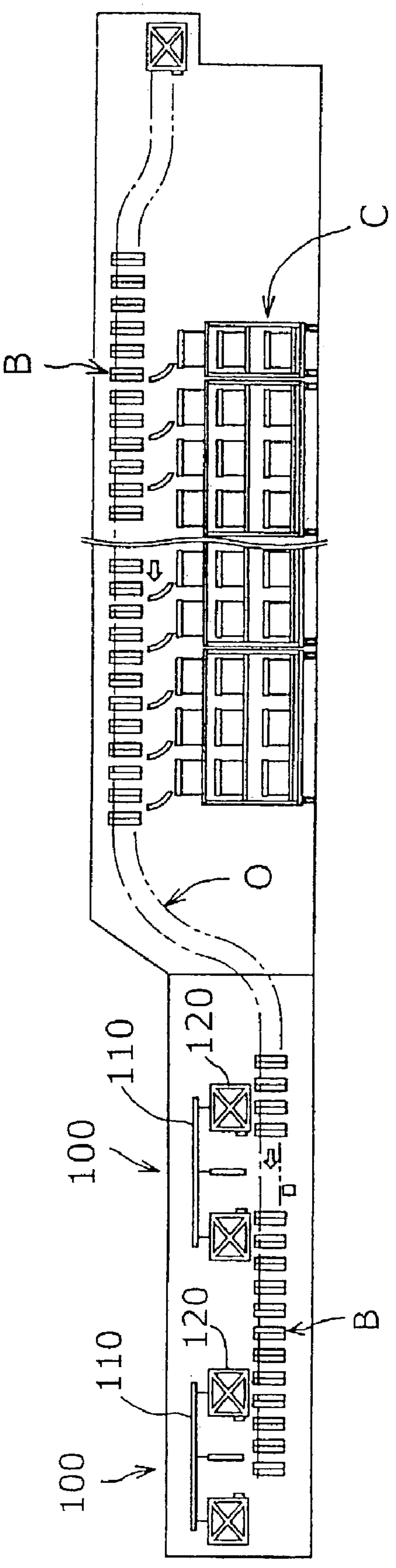
FIG. 1 is a front view showing an embodiment of a mail sorting and distributing transfer system, which is one example of the present invention.
Figure 2:
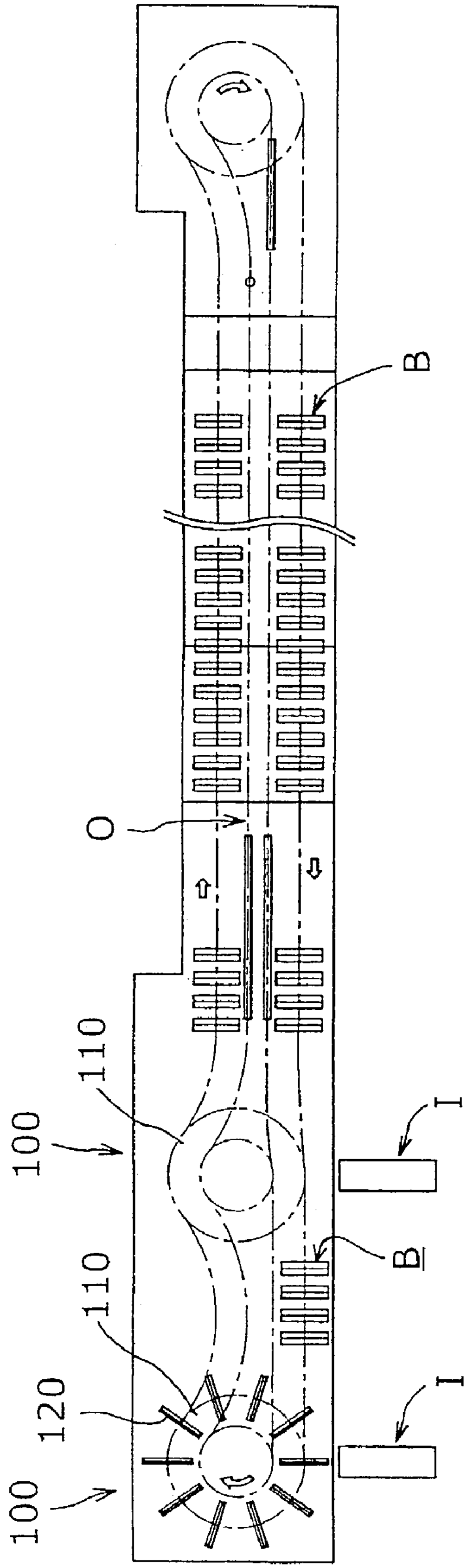
FIG. 2 is a plan view showing an embodiment of the mail sorting and distributing transfer system shown in FIG. 1.

A mail sorting and distributing transfer system 100 of an example according to the present invention, as shown in FIGS. 1 and 2, receives mail M (see FIG. 6) supplied from a mail charging line I including a mail sorting receiver data reader or the like through a transfer basket 120 provided on an outer circumferential edge of a mail sorting and distributing turntable 110. The system transfers the mail M to a conveyor basket B on the mail sorting line O through the transfer basket 120. It is noted that two mail sorting and distributing transfer apparatuses 100 in FIGS. 1 and 2, are provided on a supply side on the mail sorting line O in consideration of the types of mail M, efficiency of sorting operation and the like. Further, the reference character C in FIG. 1 denotes a mail recovery box for sorting and recovering mail M from the conveyor basket B, and the arrows in FIGS. 1 and 2 denote a movement direction of the conveyor baskets B, which are moved under the transfer baskets 120 in synchronization with the transfer baskets 120 while the mail sorting line O is circulated.

Thus, the mail sorting and distributing transfer system 100 of an example according to the present invention will be described in detail with reference to FIGS. 3 to 8. First, the sorting and distributing turntable 110 is rotatable in the same direction as the transfer baskets B, which circulate under the sorting and distributing turntable 110 with the transfer baskets B pivoted on the framework side. Then the sorting and distributing turntable 110 is synchronously turned with a not-shown chain wheel, which circulates the conveyor baskets B by a not-shown synchronous encoder provided on an upper portion on the framework side so that transferable time in the transferring mail from the transfer baskets 120 to the conveyor baskets B can be sufficiently ensured. The sorting and distributing turntable 110 includes arc-shaped guide rails 111, which can slidably guide the transfer baskets 120 and slots 112 (see FIGS. 4 and 6) for pivotally moving the transfer baskets 120.

Figure 3:
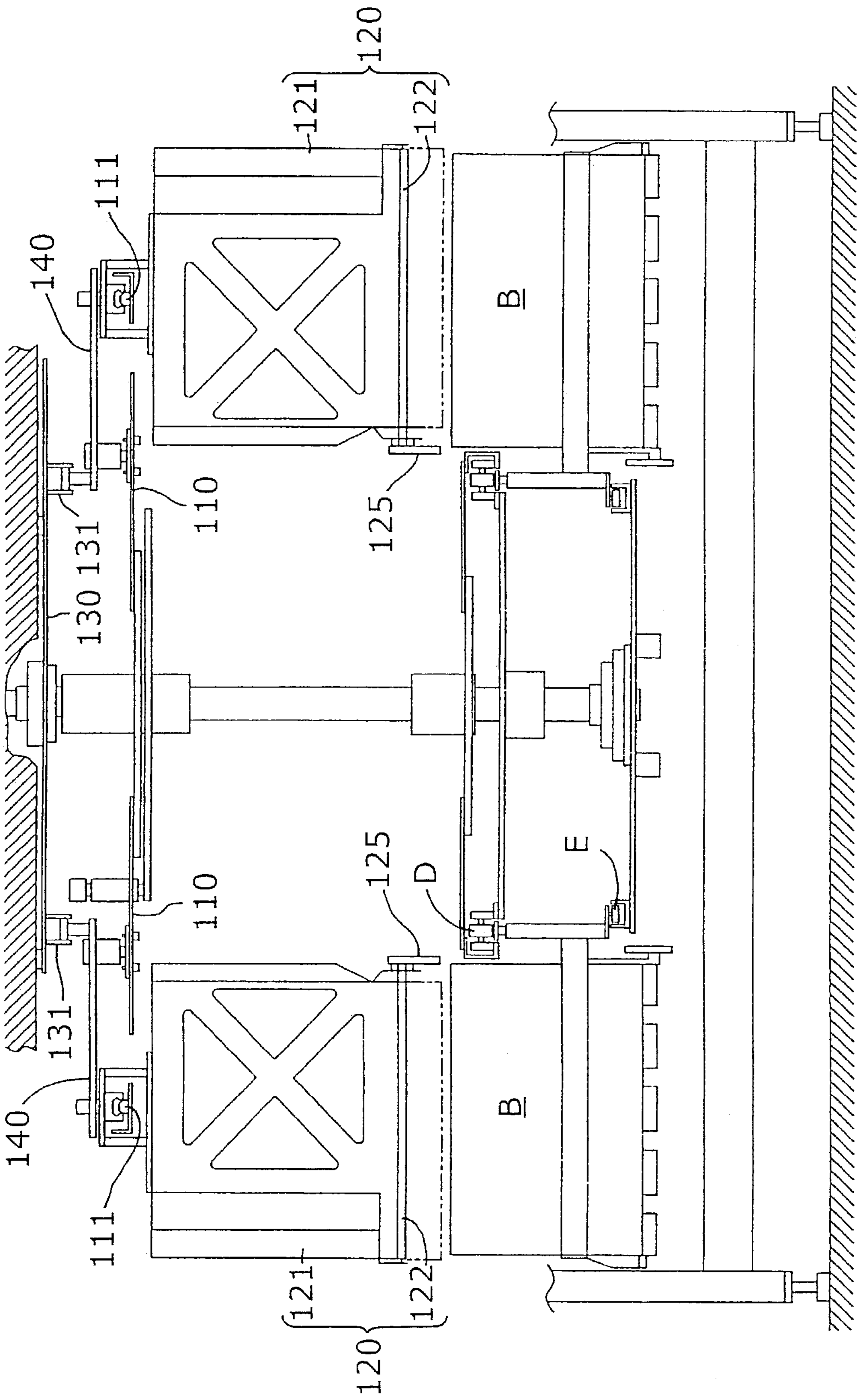
FIG. 3 is a transverse view of the mail sorting and distributing transfer apparatus according to the present invention.

The box-shaped transfer baskets 120 are mounted on an outer circumferential edge of the sorting and distributing turntable 110 at regular intervals and each includes a receipt port 121 for receiving mail M supplied through the mail charging line I and a transfer port 122 consisting of an openable bottom lid for transferring the mail M to the conveyor basket B on the mail sorting line O, as shown in FIG. 3. The mail sorting line O moves the conveyor baskets B in parallel to and in synchronization with the transfer baskets 120 as they travel around with the turntable 110. It is noted that the reference numeral 124 in FIG. 6 denotes a mount bracket for mounting a transfer basket body 123 on the perimeter of the sorting and distributing turntable 110, and the reference numeral 125 (FIG. 3) denotes a rocker mechanism, which opens the transfer 122 port.

Figure 4:
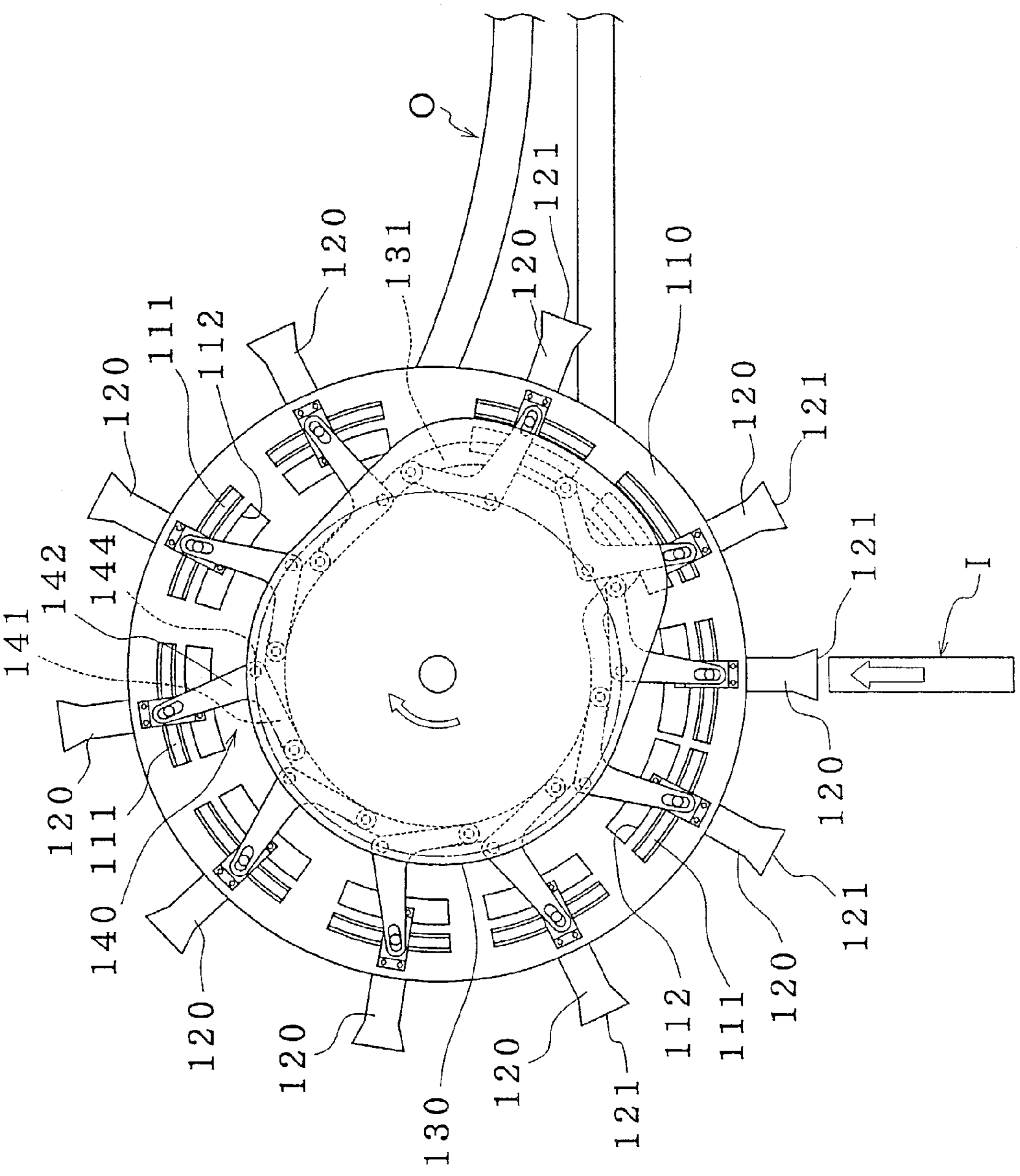
FIG. 4 is a plan view of the mail sorting and distributing transfer apparatus according to the present invention.
Figure 8:
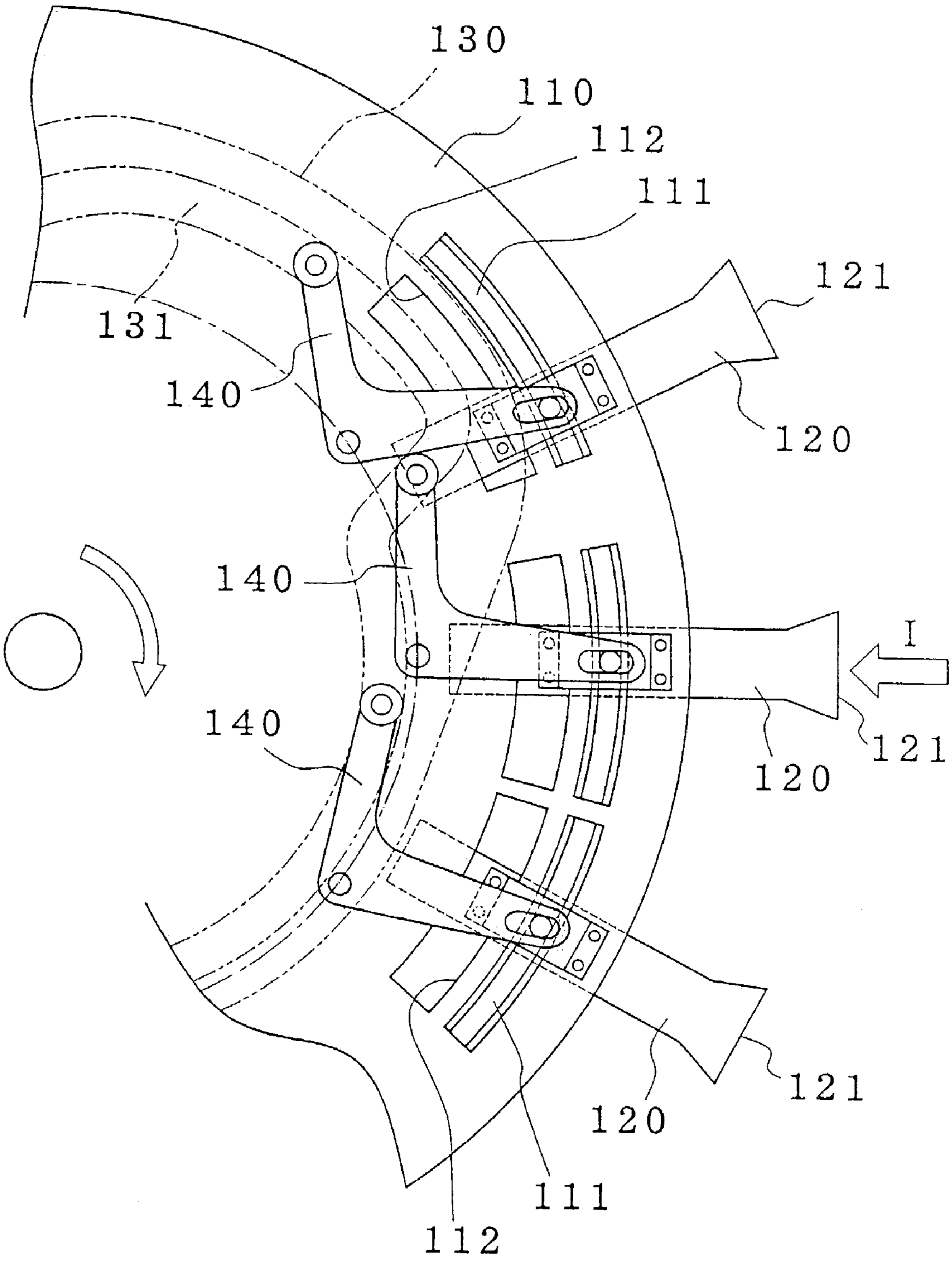
FIG. 8 is an operational view of the transfer timing lever and a transfer basket showing their movement at the mail-charging line.

Further, the fixed frame 130 of the mail sorting and distributing transfer system 100 of the illustrated embodiment of the present invention has a transfer timing track 131, which, as shown in broken lines in FIGS. 4 and 8, can be optionally set with timing for transferring mail M from the mail charging line I to the transfer basket 120 by cooperating with the transfer timing lever 140 on the sorting and distributing turntable 110 as the table relatively turns. The timing assures that the receipt port 121 of the transfer basket 120 is maintained in registry with the mail charging line I during the receipt of mail. At the same time, the transfer basket 120 and the conveyor basket B are moved in parallel to each other and in synchronization with each other during the transfer of mail.

Figure 5:
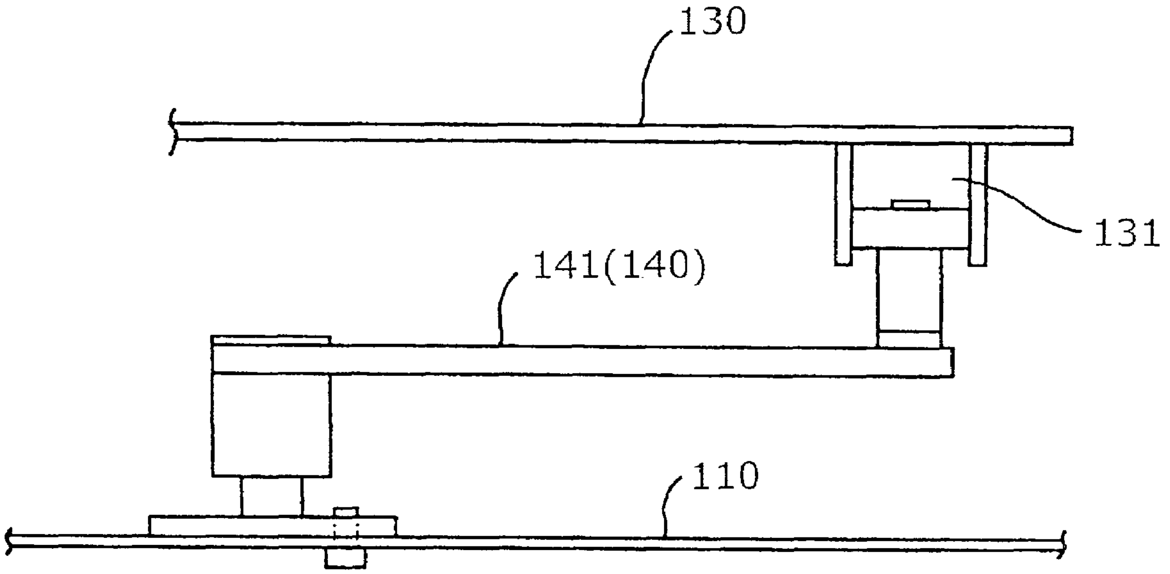
FIG. 5 is a fragmentary view showing a follower arm of a transfer timing lever and a transfer timing track on a framework side fixed frame.
Figure 6:
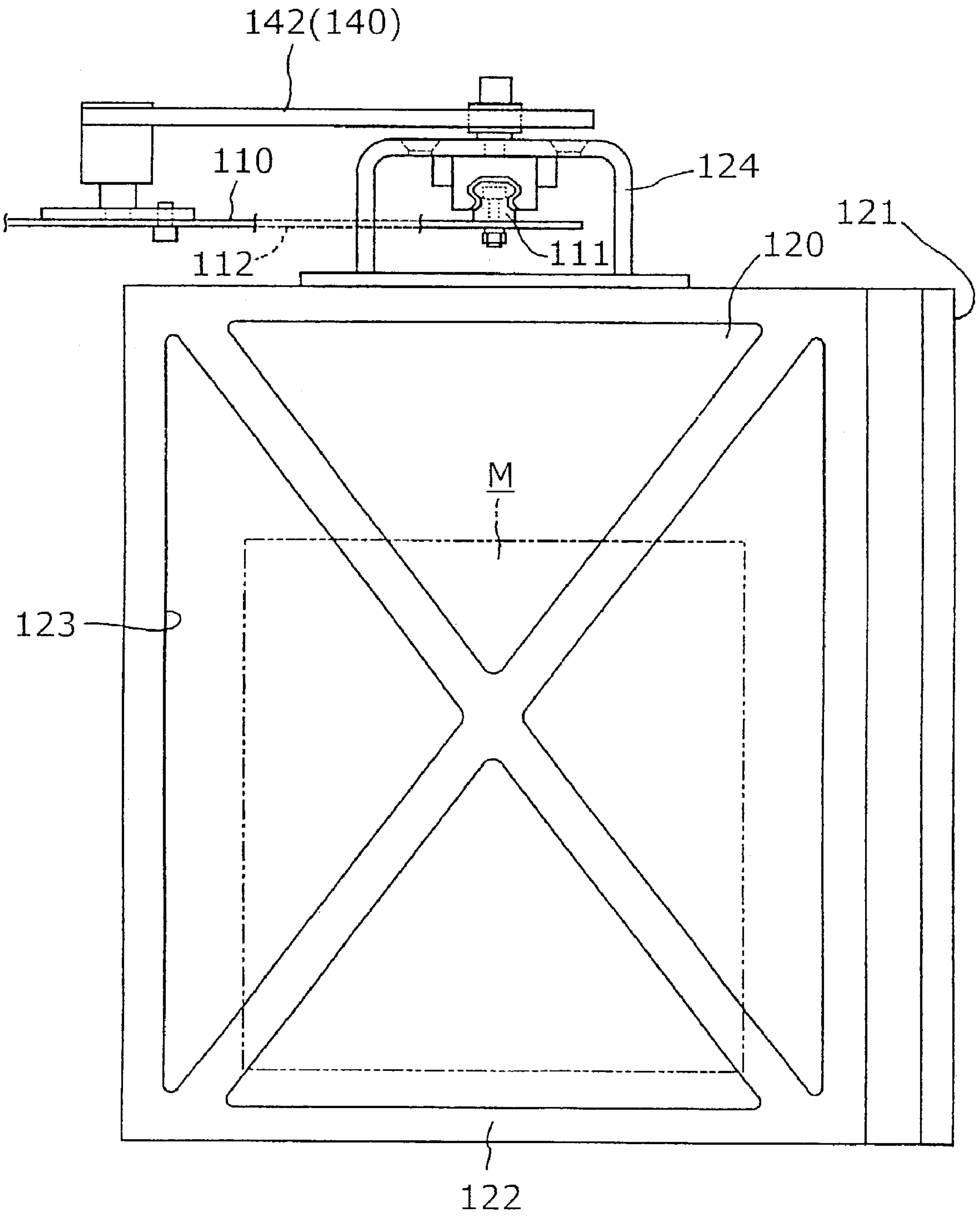
FIG. 6 is a fragmentary view showing a suspended arm of a transfer timing lever and an arc-shaped guide rail of a sorting and distributing turntable.
Figure 7:
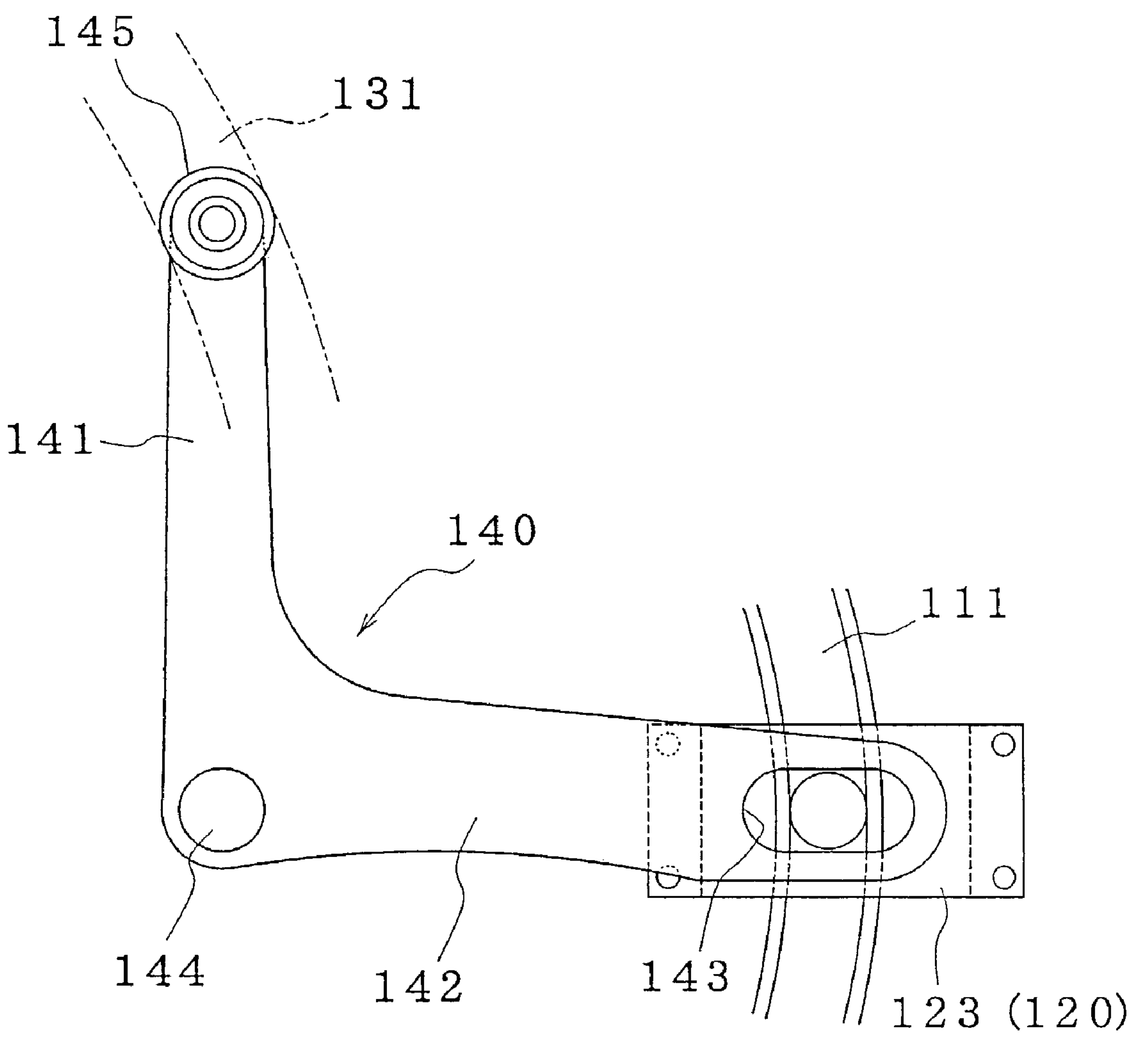
FIG. 7 is an enlarged plan view of a transfer timing lever.

Further, the plurality of transfer timing levers 140 are pivoted at regular intervals on an inner circumference of the sorting and distributing turntable 110 corresponding to the regular intervals at which the transfer baskets 120 are provided on an outer circumferential edge of the sorting and distributing turntable 110, as shown in FIG. 4. Each of the transfer timing levers 140 comprises a follower arm 141 following along the transfer timing track 131 as shown in FIG. 5 and a suspended arm 142 following along the arc-shaped guide rail 111 on the sorting and distributing turntable 110 as shown in FIG. 6. As shown in FIG. 7, the transfer timing lever 140 is in the form of an L-shaped lever. It is noted that the reference numeral 143 in FIG. 7 denoted a slide adjusting slot for pivotally moving the transfer basket 120.

The driving side of the mail sorting and distributing line O is positioned just under the transfer baskets 120, as shown in FIG. 3. The reference character D in FIG. 3 denotes a driving chain for connecting a number of conveyor baskets B travel in the line O with the turntable, and the reference character E denotes a side roller for stabilizing the conveyor basket B, allowing the baskets B to pivot with the baskets 120. It is noted that on the driving side of the mail sorting, line O is provided with an opening/closing mechanism 125 including a rocker pin, a release lever and the like for opening/closing a rocker mechanism for the transfer port 122 in the transfer basket 120.

In the illustrated mail sorting and distributing transfer system 100, the receipt port 121 of the transfer basket 120 is maintained to a state where it is in registry with the mail charging line I during the receipt of mail and at the same time the transfer basket 120 and the conveyor basket B are moved in parallel to each other in synchronization with each other during the transfer of mail. Accordingly, it is difficult to cause transfer failure which occurs in a conventional apparatus due to the shift of transfer timing. Therefore, according to the mail sorting and distributing transfer system 100 of the example according to the present invention, the transfer timing is significantly ensured so that mail can be reliably transferred during the receipt of mail in the transfer basket 120 or during the transfer of mail to the conveyor basket B. Further, since the transfer timing lever 140 smoothly follows the transfer timing track 131, to pivot during the receipt of mail, a state where the receipt port 121 of the transfer basket 120 is in registry with the mail charging line I can be stably, reliably maintained. Further, various transfer start timing and transferable time can be set in accordance with the path shape of the transfer timing path 131 with good effect.

As described above, the mail sorting and distributing transfer system receives mail supplied from a mail charging line through receipt ports of transfer baskets provided on the outer circumferential edge of a mail sorting and distributing turntable and transfers the mail to underlying conveyor baskets on the mail sorting line through transfer openable ports in the bottom portions of the transfer baskets. Transfer timing levers maintain the receipt ports of transfer baskets in registry with the mail discharging line during the receipt of mail, and the conveyor baaskets pivot so they move in parallel to and in synchronization with the transfer baskets. The baskets are pivoted about the shafts provided in said mail sorting and distributing turntable. Thus, the following advantages are achieved by the present invention.

In the mail sorting and distributing transfer system, a sorting and distributing turntable has transfer timing levers pivoted about shafts on an outer circumferential edge of the turntable to pivot transfer baskets for transferring mail supplied through the mail charging line. Thus, the receipt ports of the transfer baskets are maintained in a state of registry with the mail charging line during the receipt of mail. At the same time, the transfer baskets and the conveyor baskets move in parallel to and in synchronization with each other during the transfer of mail. Accordingly, it is difficult to cause the transfer failure due to the shift of transfer timing conventionally generated in prior art structures. Further, the invention increases the respective transferable time in the receipt of mail in the transfer baskets through the mail charging line and in the transfer of mail from the transfer baskets to the conveyor baskets from the transfer baskets. Proper timing can be significantly ensured and mail supplied from the mail charging line can be reliably transferred to the conveyor baskets on the mail sorting and distributing line.

Further, an additional advantage results from providing the transfer timing lever with a follower arm which follows a transfer timing track formed on a framework side fixed frame and a suspended arm which slidably follows an arc-shaped guide rail on said mail sorting and distributing turntable. Thus, the transfer timing lever is pivoted about an axis parallel to the axis of the sorting and distributing turntable and is smoothly pivoted by the transfer timing track during the receipt of mail. During the receipt of mail, a state where the receipt port of the transfer basket is in registry with the mail charging line can be stably, reliably maintained. Further, various transfer start timing and transferable time can be set in accordance with the path shape of the transfer timing track.

What is claimed is:

1. A mail sorting and distributing transfer system for transferring mall from a mail charging line to a mail sorting line comprising conveyor baskets, said system having a mail sorting and distributing turntable with shafts along an outer circumferential edge, and transfer baskets pivotally mounted on said shafts, said sorting line operable to position each conveyor basket under a transfer basket, said conveyor baskets and transfer baskets operable to move in parallel to and in synchronization with each other, each said transfer basket having a receipt port adapted to receive mail supplied from the mail charging line, and an openable transfer port on a bottom portion of said transfer baskets adapted to transfer the mail to an underlying conveyor basket of the mall sorting line, said system further comprising transfer timing levers, which maintain said receipt ports of transfer baskets in a state of registry with the mail charging line during the transfer of mail, each lever being associated with a transfer basket and being pivotal so that it moves the associated transfer basket about said shafts of said mail sorting and distributing turntable and maintain the receipt port of the transfer basket in registry with the mail charging line during the receipt of the mail by said transfer baskets.

2. The mail sorting and distributing transfer system of claim 1, including a fixed frame supporting said turntable for rotation about a central axis and an arc-shaped guide rail on said mall sorting and distributing turntable, a transfer timing track on said fixed frame, each of said transfer timing levers comprising an L-shaped lever having a follower arm adapted to travel along said transfer timing track, a suspended arm slidable along said guide rail, and a pivot fulcrum at the junction of said arms, said track and rail having a configuration to pivot said transfer basket on its shaft to maintain its receipt port in registry with said mail charging line during transfer of mail.

3. The mail sorting and distributing transfer system of claim 2 wherein each of said conveyor baskets is pivotally mounted on said mail sorting line on a pivot axis, each of said transfer basket shafts being aligned with the pivot shaft of the conveyor basket under said transfer basket to maintain parallel and synchronous movement of the conveyor basket and the transfer basket.

4. The mail sorting and distributing transfer system of claim 1, wherein said mail sorting line has a semicircular path segment around a center, said turntable being rotatable about said center so that its outer circumferential edge overlies said semi-circular path segment and said conveyor baskets are positioned below said transfer baskets as they move in the semicircular path segment.

* * * * *